(12) United States Patent
Munoz (10) Patent No.: US 9,089,107 B2
(45) Date of Patent: Jul. 28, 2015

(54) EQUINE PROTECTIVE BOOT (71) Applicant: Mariti Antonio Munoz, Brownsville, TX (US)

(72) Inventor: Mariti Antonio Munoz, Brownsville, TX (US)

(*) Notice: Subject to any disclaimer, the term of this patent is extended or adjusted under 35 U.S.C. 154(b) by 92 days.

(21) Appl. No.: 13/860,147

(22) Filed: Apr. 10, 2013

(65) Prior Publication Data

US 2014/0305085 A1 Oct. 16, 2014

(51) Int. Cl.
*B68C 5/00* (2006.01)
*A01K 13/00* (2006.01)

(52) U.S. Cl.
CPC ............... *A01K 13/007* (2013.01); *B68C 5/00* (2013.01)

(58) Field of Classification Search
CPC ............................... A01K 13/007; B68C 5/00
USPC .................... 54/82; 168/18, 1, 2, 22; 119/850
See application file for complete search history.

(56) References Cited

U.S. PATENT DOCUMENTS

| | | | | |
|---|---|---|---|---|
| 482,041 A * | 9/1892 | Hurd | ................................. | 54/82 |
| 2,163,361 A * | 6/1939 | Ford et al. | ........................ | 168/2 |
| 2,512,925 A * | 6/1950 | Eggeman | ......................... | 54/82 |
| 3,405,506 A * | 10/1968 | Kostur | ............................... | 54/82 |
| 4,342,185 A * | 8/1982 | Pellew | ............................... | 54/82 |
| 5,579,627 A * | 12/1996 | Vogt | ................................... | 54/82 |
| 6,918,236 B2 * | 7/2005 | Springs | ............................. | 54/82 |
| 2009/0288377 A1* | 11/2009 | Heid et al. | ....................... | 54/82 |
| 2013/0061563 A1* | 3/2013 | Mills | ............................... | 53/461 |

* cited by examiner

*Primary Examiner* — Rob Swiatek
*Assistant Examiner* — Magdalena Topolski
(74) *Attorney, Agent, or Firm* — Egbert Law Offices, PLLC (57) ABSTRACT

A protective boot for the ankle of a horse includes a flexible panel with a middle portion and two opposing side portions extending outwardly therefrom. The middle portion is suitable for abutting the digital flexor tendon of the horse. The two opposing side portions are suitable for wrapping around the ankle of the horse. A slot is provided which extends along the digital extensor tendon and is defined by the two opposing side portions. A cup is formed at a bottom of the middle portion, the cup receiving the proximal sesamoid bones of the ankle of the horse. Lateral grooves are provided, which are positioned over the palmar digital veins of the horse. The flexible panel includes an outer foam layer and an inner heat-absorbing layer. A reinforcing elastic wrap is removably affixed around the flexible panel.

14 Claims, 11 Drawing Sheets

EQUINE PROTECTIVE BOOT

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the field of protective boots for horses. More particularly, the present invention the relates to an equine protective boot which allows for proper support, flexibility and proper blood flow in the condylar area of the horse leg.

2. Description of Related Art Including Information Disclosed Under 37 CFR 1.97 and 37 CFR 1.98

Tendon injury is one of the most common forms of musculoskeletal injuries that occur to horses competing in all disciplines. Injuries to the musculoskeletal system have been found to account for 82% of all injuries to racehorses competing National Hunt and flat races, and of these 46% involved tendons ligaments (Williams et al. 2001; Ely et al. 2004). Another study reported that tendon or ligament strain accounts for 53% musculoskeletal injuries that occur during hurdle and steeplechase races (Pinchbeck et al. 2004). A 12-year epidemiological study found that tendon injury was the most common reason for retirement in racing Thoroughbreds in Hong Kong (Lam et al. 2007). Furthermore, it has been found that, over the period of one season, 15% of both National Hunt horses (Ely et al. 2004) and Thoroughbred flat racehorses (Kasashima et al. 2004) in training suffered from a tendon at ligament injury as diagnosed by ultrasound. Some tendons are much more prone to injury than others; the majority of tendon injuries (97-99%) occur to the forelimb tendons (Kasashima et al. 2004; Lam et al. 2007), with the superficial digital flexor tendon (SDFT) being injured 75-93% of cases and the remaining injuries occurring to the suspensory ligament (SL) (Ely et al. 2004; Kasashima et al. 2004).

Tendon injury is one of the most common causes of wastage in the performance horse; the majority of tendon injuries occur to the superficial digital flexor tendon whereas few occur to the common digital extensor tendon. These days, a myriad of products are available to protect a horse's legs from injury, including many different types of ankle boots, skid boots, splint boots, knee boots, support boots, and leg wraps. These products often offer new designs and incorporate new materials. With all the innovations there still isn't a support boot that is used to track horses in the race industry or used in races. They are bulky and the outer layer is made mainly from loop fabric material, which tends to gather dirt and sand. Support boots as we know them actually inhibit the motion of the ankle, as the main panels are one piece covering the third metacarpal and a portion of the proximal phalanx, then strapping them together. Support boots serve mainly as protection from strikes and offer ligament support at the cost of a loss of motion. Another pitfall in support boots is the retention of heal.

For example, U.S. Pat. Nos. 5,910,126, 5,115,627 and 5,579,627 describe various types of equine leg wraps and supports. Generally speaking, these prior devices include flexible panels configured to wrap about the lower portions of horse's legs and have attachment means for securing the panels in place. Typically, the flexible panels are formed of resilient neoprene or similar foam materials having conventional loop facings promoting heat buildup and accumulating debris.

Furthermore, the one-piece equine leg wraps of the prior art cover and strap the bones inhibiting the motion. For example, U.S. Pat. No. 5,579,627 describes a wrap including an integral lower fastener to provide additional support for the fetlock joint. Another conventional method for support is the use of elastic wraps applied straight on to the limbs. This practice has its pitfalls as well. If applied wrongly or left too long, it can cause tendon damage and constrict the flow of blood.

Figure 1:
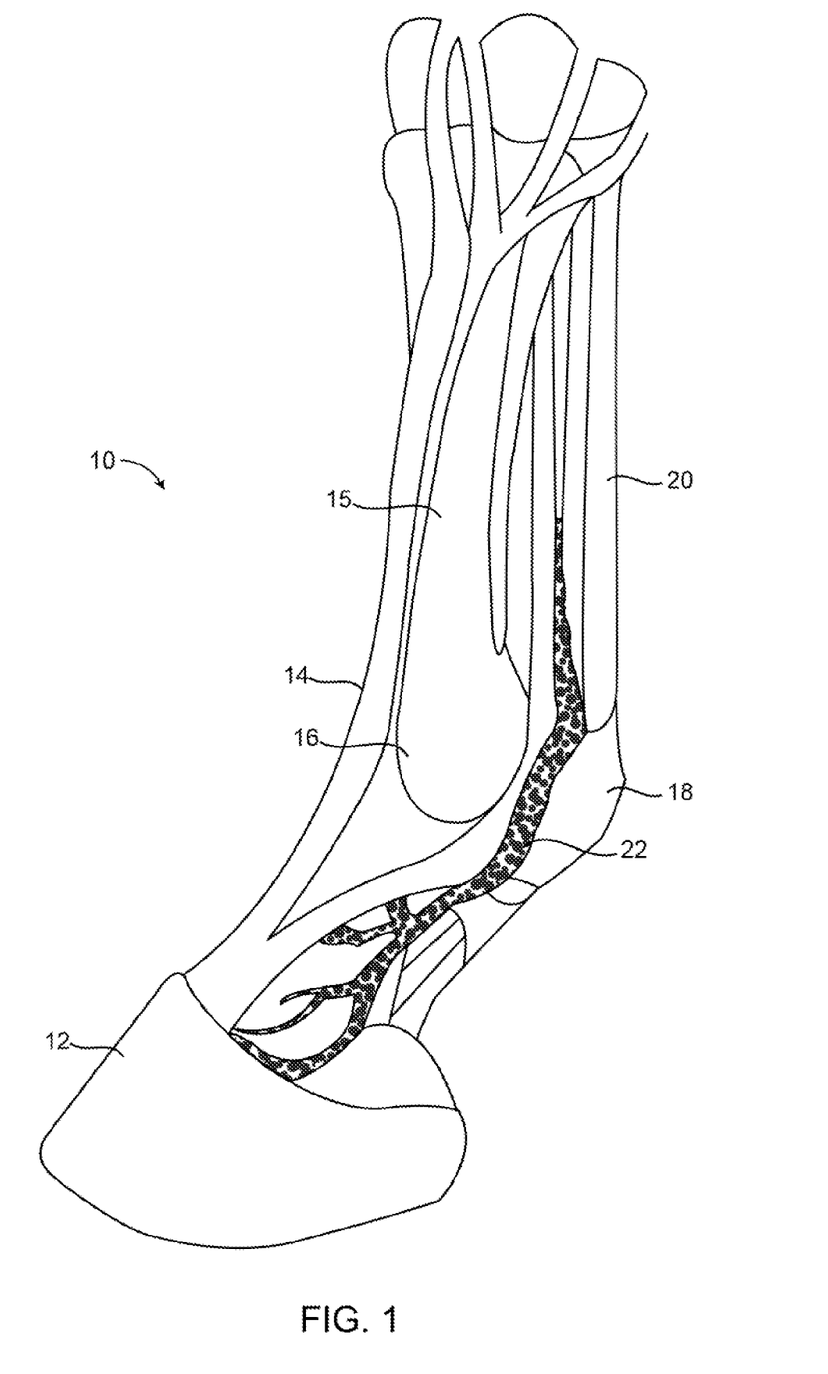
FIG. 1 is anatomical view of the ankle of a horse.

FIG. 1 shows an anatomical view of the ankle 10 of a horse. The ankle 10 has a hoof 12. A common digital extensor tendon (digital extensor tendon) 14 runs along the front of the horse's leg over the cannon bone 15. The fetlock joint 16 is shown generally behind the digital extensor tendon 14. A superficial digital flexor tendon 20 (digital flexor tendon) extends along the back of the ankle 10 of the horse. Proximal sesamoid bones 18 are shown at the bottom of the digital flexor tendon 20. Adjacent the sesamoid bones 18, there is shown a palmar digital vein 22. Another palmar digital vein is present on the opposite side of the ankle.

As discussed above, prior art equine leg wraps typically inhibit movement of the digital extensor tendon 14. Further, many of these prior art equine leg wraps and boots also inhibit blood flow through the palmar digital vein 22.

It is an object of the present invention to provide an equine protective boot that allows for proper support, flexibility and proper blood flow in the condylar area of a horse's leg.

It is another object of the present invention to provide an equine protective boot that bridges the horse's digital extensor tendon.

It is another object of the present invention to provide an equine protective boot which prevents heat buildup at the horse's ankle.

It is yet another object of the present invention to provide an equine protective boot which prevents bowed tendons, particular bowed digital flexor tendons.

It is a farther object of the present invention to provide an equine protective boot that absorbs shocks and strikes.

It is yet another object of the present invention to provide an equine protective boot which repels sand, dirt and water.

It is yet another object of the present invention to provide an equine protective boot which prevents hyper-extension in the horse's ankle.

Finally, it is another object of the present invention to provide an equine protective boot which aids in the turnover of the foot in motion, preventing stumbling, increasing speed and relieving biomechanical stress.

These and other objects and advantages of the present invention will become apparent from a reading of the attached specification and appended claims.

BRIEF SUMMARY OF THE INVENTION

The present invention is a protective boot for the ankle of a horse, the ankle having a common digital extensor tendon on a front thereof and a superficial digital flexor tendon on a back thereof. The protective boot includes a flexible panel with a middle portion and two opposing side portions extending outwardly therefrom. The middle portion is suitable for abutting the superficial digital flexor tendon of the horse. The two opposing side portions are suitable for wrapping around the ankle of the horse. A slot is provided that is suitable for extending along the common digital extensor tendon of the ankle of the horse. The slot is defined by the two opposing side portions when the two opposing side portions are placed around the ankle of the horse. Further, the protective boot includes a reinforcing elastic wrap removably affixed around the flexible panel. The ankle of the horse also has proximal sesamoid bones, and the boot includes a cup formed at a bottom of the middle portion of the flexible panel. The cup is suitable for receiving the proximal sesamoid bones of the ankle of the horse.

The ankle of the horse also has a first digital palmar vein and a second digital palmar vein adjacent the proximal sesamoid bones. The protective boot includes a first groove formed between the cup and one of the two opposing side portions. The first groove is suitable for positioning over the first palmar digital vein. A second groove is formed between the cup and another of the two opposing side portions. The second groove is suitable for positioning over the second palmar digital vein. The middle portion of the flexible panel has a first thickness, while the two opposing side portions of the flexible panel has a second thickness. The first thickness is greater than the second thickness.

In the present invention, the flexible panel of the boot is formed of a foam material such as: polyurethane, ethylene/vinyl acetate copolymer, latex, polyethylene, polypropylene, silicon, cellulose acetate, neoprene, polyvinylchloride, polyester, ester and combinations thereof. The flexible panel includes an outer foam layer, as described hereinabove, and an inner heat-absorbing layer lined adjacent the outer foam layer.

The present invention is also a protective boot for the ankle of a horse. The protective boot has a flexible panel with a middle portion and two opposing side portions extending outwardly therefrom. The middle portion is suitable for abutting the superficial digital flexor tendon of the horse. The two opposing side portions are suitable for wrapping around the ankle of the horse. A cup is formed at a bottom of the middle portion of the flexible panel and is suitable for receiving the proximal sesamoid bones of the horse. A first groove is formed between the cup and one of the two opposing side portions. The first groove is suitable for positioning over the first palmar digital vein. The second groove is formed between the cup and another of the two opposing side portions. The second groove is suitable for positioning over the second palmar digital vein. A reinforcing wrap is removably affixed around the flexible panel and the cup. The reinforcing wrap may include an inner neoprene layer and an outer laminate layer adhered against the inner neoprene layer.

In the present invention, a slot extends along the common digital extensor tendon of the horse. The slot is defined by the two opposing side portions when the two opposing side portions are wrapped around the ankle of the horse. The middle portion of the flexible panel has a first thickness and the two opposing side portions of the flexible panel have a second thickness, the first thickness being greater than the second thickness.

The flexible panel may include an outer foam layer and an inner heat-absorbing layer lined against the outer foam layer. The inner heat-absorbing layer has a microencapsulated phase change material thereon or therein, which is suitable for absorbing, storing, and releasing excess heat. Each of the two opposing side portions may have a concavo-convex formation at a lower end thereof. The concavo-convex formations are suitable for receiving the fetlock joint of the ankle of the horse.

The present invention is also a protective boot for use on an ankle of a horse. The protective boot includes a flexible panel with a middle portion and two opposing side portions extending outwardly therefrom. The middle portion is suitable for abutting the superficial digital flexor tendon of the horse. The two opposing side portions are suitable for wrapping around the ankle of the horse. The middle portion of the flexible panel has a thickness greater than a thickness of the two opposing side portions. A reinforcing wrap is removably affixed around the flexible panel.

The foregoing section is intended to describe, in generality, the preferred embodiment of the present invention. It is understood that modifications to this preferred embodiment can be made within the scope of the present invention. As such, this section should not to be construed, in any way, as limiting of the scope of the present invention. The present invention should only be limited by the following claims and their legal equivalents.

DETAILED DESCRIPTION OF THE INVENTION

Figure 2:
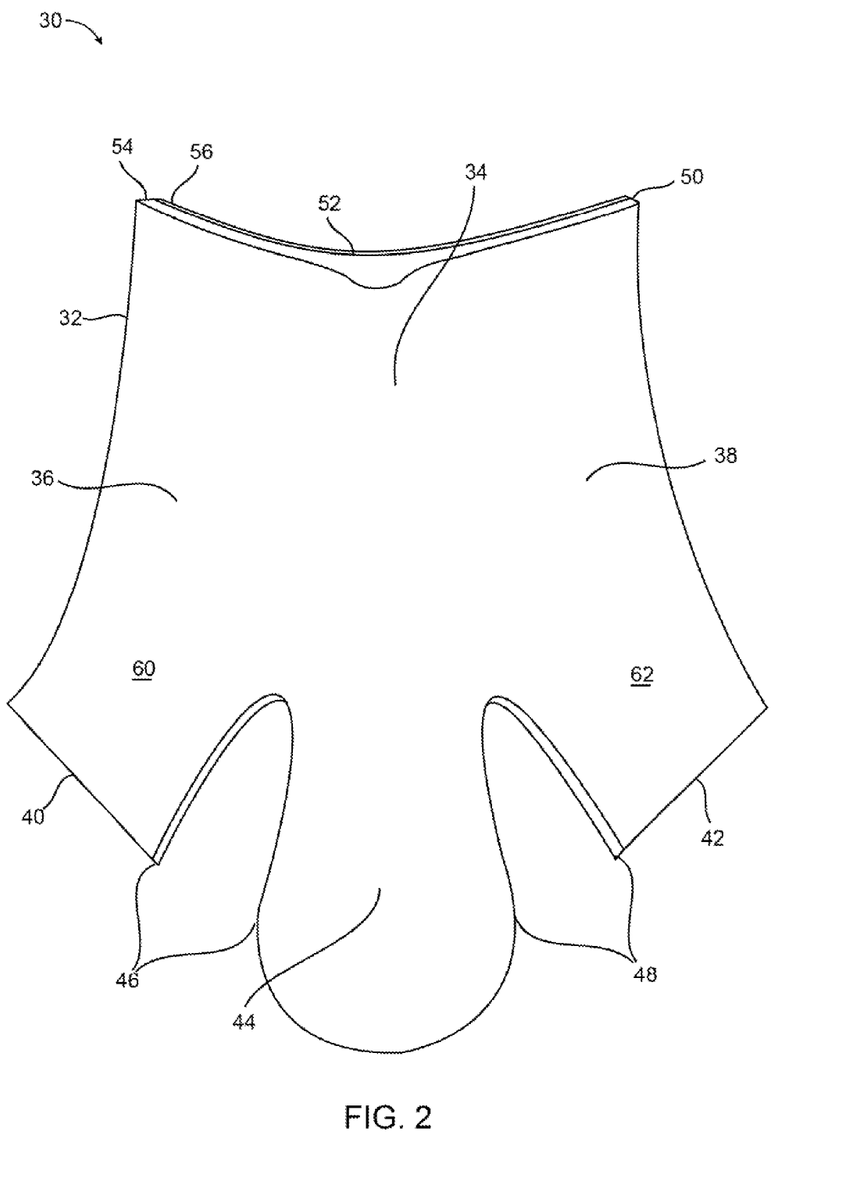
FIG. 2 is a rear view of the equine protective boot of the present invention.

Referring to FIG. 2, there is shown a rear view of the equine protective boot 30 of the present invention. The equine protective boot 30 includes a flexible panel 32. The flexible panel 32 includes a middle portion 34 and two opposing side portions. The two opposing side portions include a first side portion 36 and a second side portion 38.

The first side portion 36 has an edge 40. The edge 40 is cut at an approximately 45° angle relative to the ground. The second side portion 38 has an edge 42, which is also cut at an angle approximately 45° relative to the ground.

A cup 44 is formed at a lower end of the flexible panel 32, adjacent the middle portion 34. The cup 44 extends downwardly from the flexible panel 32. The cup 44 and the first side portion 36 define a first lateral groove 46. Similarly, the cup 44 and the second side portion 38 define a second lateral groove 48.

A first concavo-convex formation 60 is formed on the first side portion 36 adjacent the edge 40. Similarly, a second concavo-convex formation 62 is formed on the second side portion 38 adjacent the edge 42.

Importantly, in FIG. 2, it can be seen that the flexible panel 32 has a first thickness 52 and a second thickness 50. The first thickness 52 is significantly thicker than the second thickness 50. Generally speaking, the first thickness 52 is present along the middle portion 34 of the flexible panel 32. The second thickness 50 is present along the first side portion 36 and the second side portion 38, in a preferred embodiment of the present invention, the second thickness 50 is between 1/4" and 3/8" thick, while the first thickness 52 is between 1/2" and 3/4" thick.

The first thickness 52 of the flexible panel 32 corresponds to the location of the digital flexor tendon. The first thickness may be a contoured foam section. This thicker portion 52 dissipates the direct pressure from the elastic reinforcing wrap 64 and prevents the risk of bowed tendons due to the direct pressure. Thus, the first thickness applies more pressure to the area in which it is needed without sacrificing flexibility in areas where less pressure is needed. Further, the differing thicknesses allow for the protective boot to be constructed using less material, resulting in decreased weight and lower production cost. The relationship between the various features of the protective boot, as shown in FIG. 2, with horse's anatomical features will explained herein below.

FIG. 2 also shows how the flexible panel 32 includes an outer layer 54 and an inner layer 56. The outer layer 54 generally speaking, is an open cell foam body which enables the boot to breath preventing heat buildup. The inner layer 56 is preferably formed of a material coated with Outlast® technology. Originally developed for NASA, this Outlast technology utilizes phase change materials (PCM) that prevents heat buildup. The micro-encapsulated veins change material on this inner layer material is suitable for absorbing, storing and releasing excessive heat.

Figure 3:
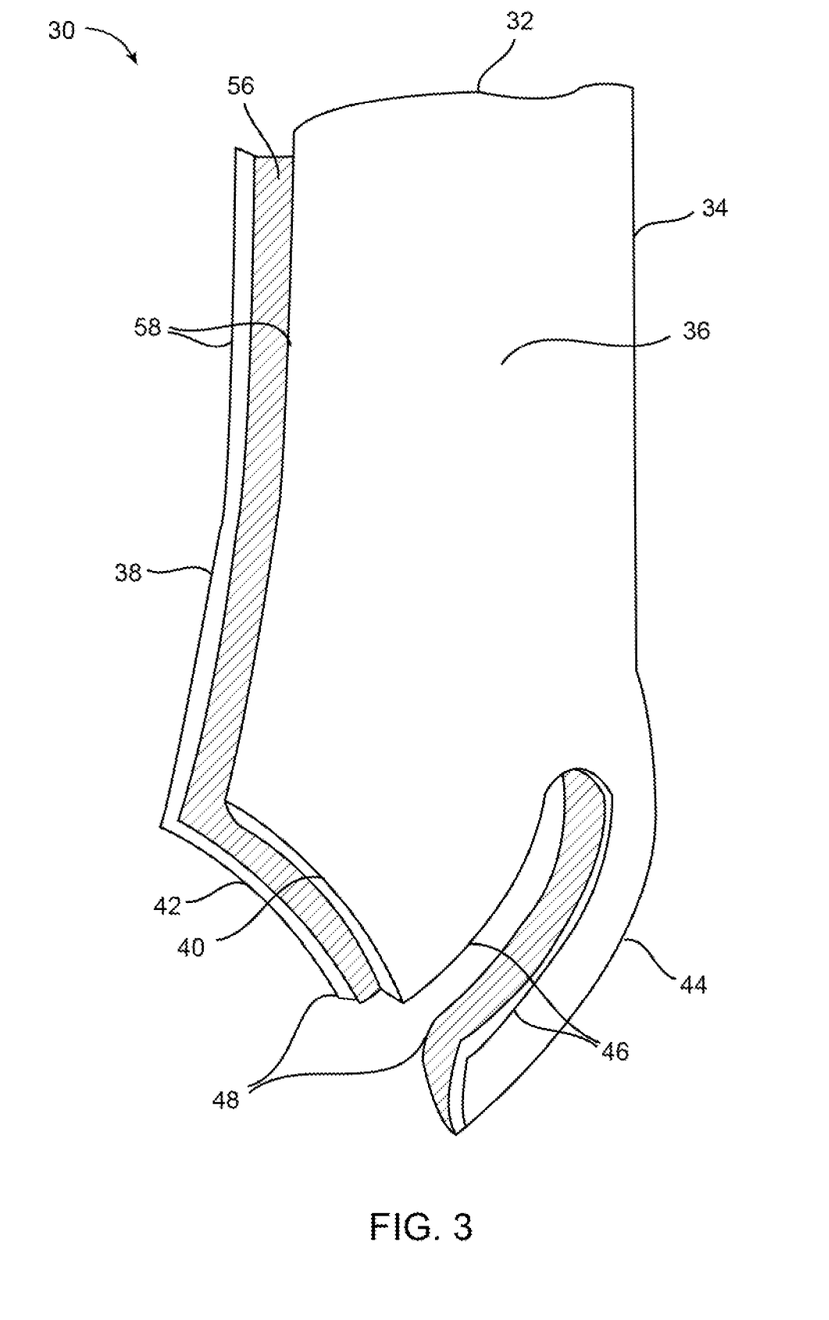
FIG. 3 is a perspective view of the equine protective boot of the present invention in a wrapped state.

FIG. 3 shows a perspective view of the equine protective boot 30 as shown in a folded or wrapped state, the horse's ankle being omitted for clarity. Importantly, in FIG. 3, a slot 58 is shown. This slot 58 is defined by the edges of the first side portion 36 and the second side portion 38. FIG. 3 also shows the general shape of the cop 44 when the protective boot is in a folded state.

Figure 4:
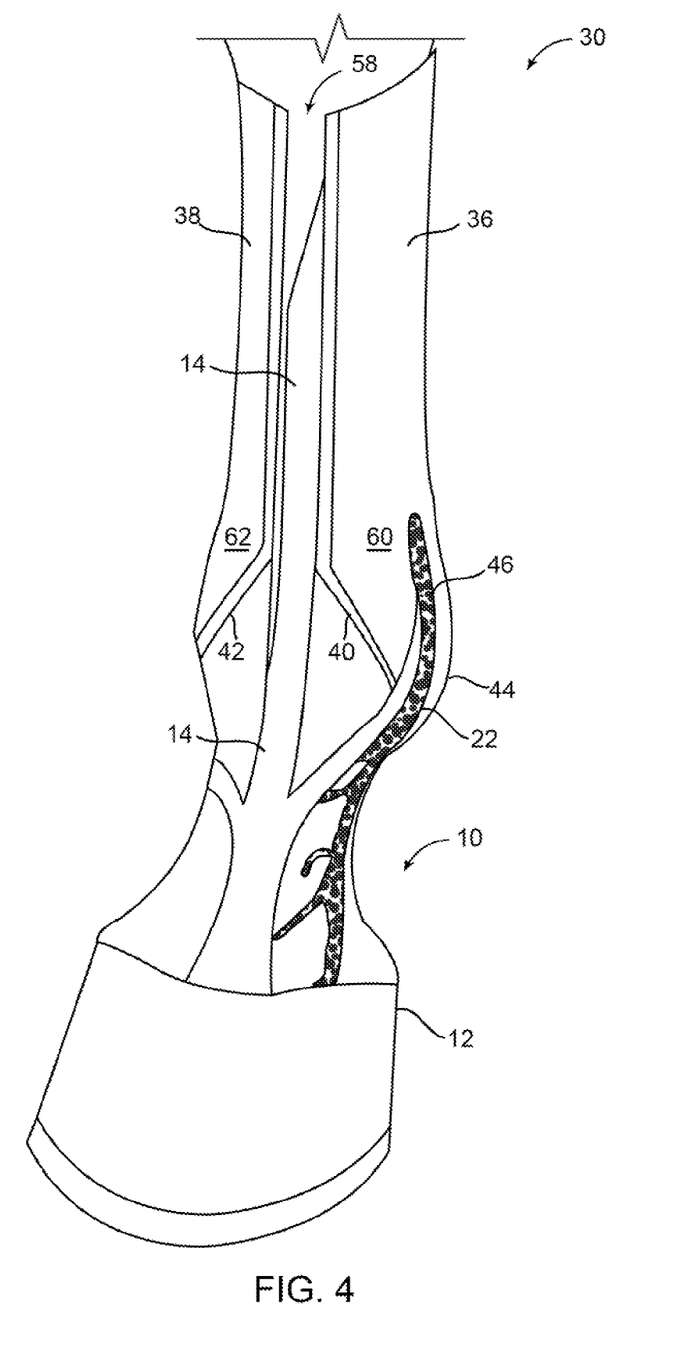
FIG. 4 is a perspective view of the equine protective boot of the present invention as applied a horse's leg, the leg being shown in an anatomical view.

Referring to FIG. 4, there is shown of the equine protective boot 30 as applied to the ankle 10 of the horse. In FIG. 4, the ankle of the horse 10 is shown in an anatomical view so as to clearly show the relationship between the various features of the equine protective boot 30 and the anatomy of the horse. First, it is shown that the digital extensor tendon 14, which extends down the front of the leg of the horse, is aligned with the slot 58 of the equine protective boot 30. Thus, when the elastic reinforcing wrap is applied (as described below), the wrap bridges the digital extensor tendon and does not apply direct pressure thereto. The configuration of the slot 58 allows for movement of the digital extensor tendon 14, but also provides lateral support thereto. The concavo-convex formations 60 and 62 are also more clear in FIG. 4. These concavo-convex formations allow for the equine protective boot 30 to adequately receive the fetlock joint of the horse.

Further, in FIG. 4, it can be seen how the first lateral groove 46 is aligned with the palmar digital vein 22. Thus, when the elastic reinforcing wrap is applied, the wrap bridges the palmar digital vein and does not apply direct pressure thereto. As such, the first lateral groove 46 allows for proper blood flow through the palmar digital vein 22. The palmar digital vein on the opposite side of the horse is similarly aligned with the second lateral groove 48. The grooves 46 and 48 also permit the cup 44 to receive the proximal sesamoid bones for a snug fit.

Figure 5:
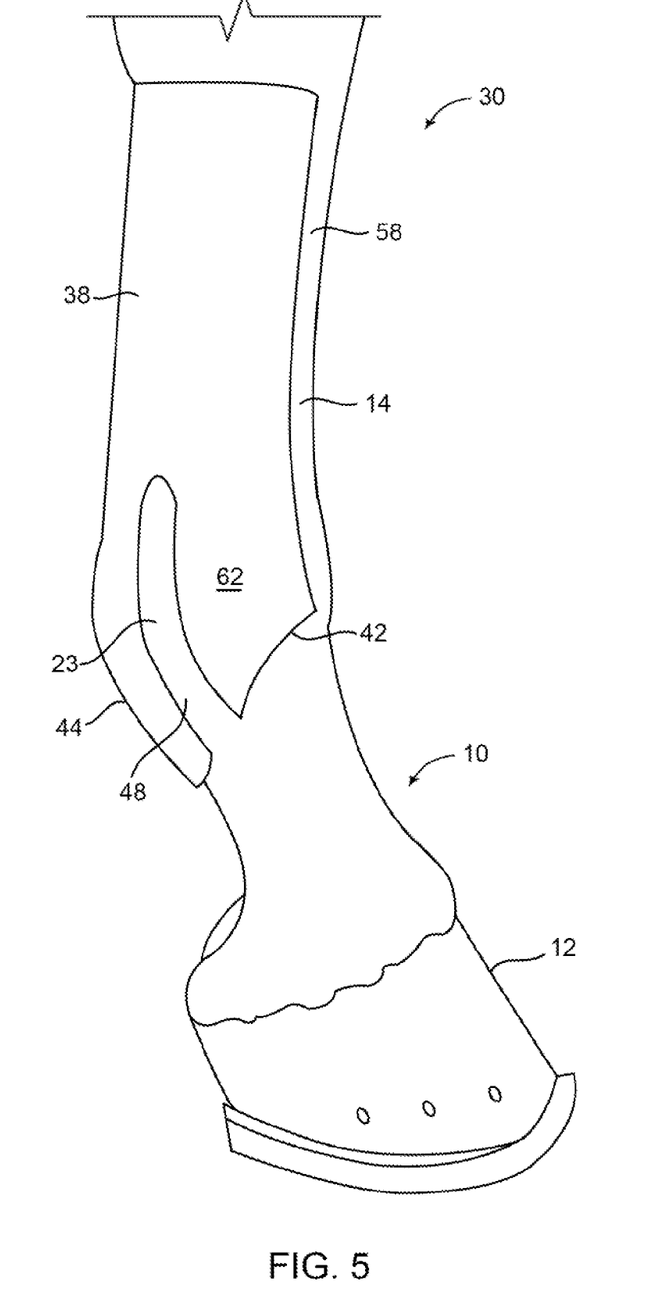
FIG. 5 is a side view of the equine protective boot of the present invention as applied to a horse's leg.

FIG. 5 shows a side view of the equine protective boot 30 as applied to the ankle 10 of the horse. FIG. 5 illustrates how the second lateral groove 48 bridges the palmar digital vein 23 on this side of the ankle 10 of the horse. FIG. 5 also shows the general shape of the cap 44, which receives the proximal sesamoid bones of the horse. The concavo-convex formation 62 is also shown in FIG. 5, which receives the fetlock joint of the horse.

Figure 6:
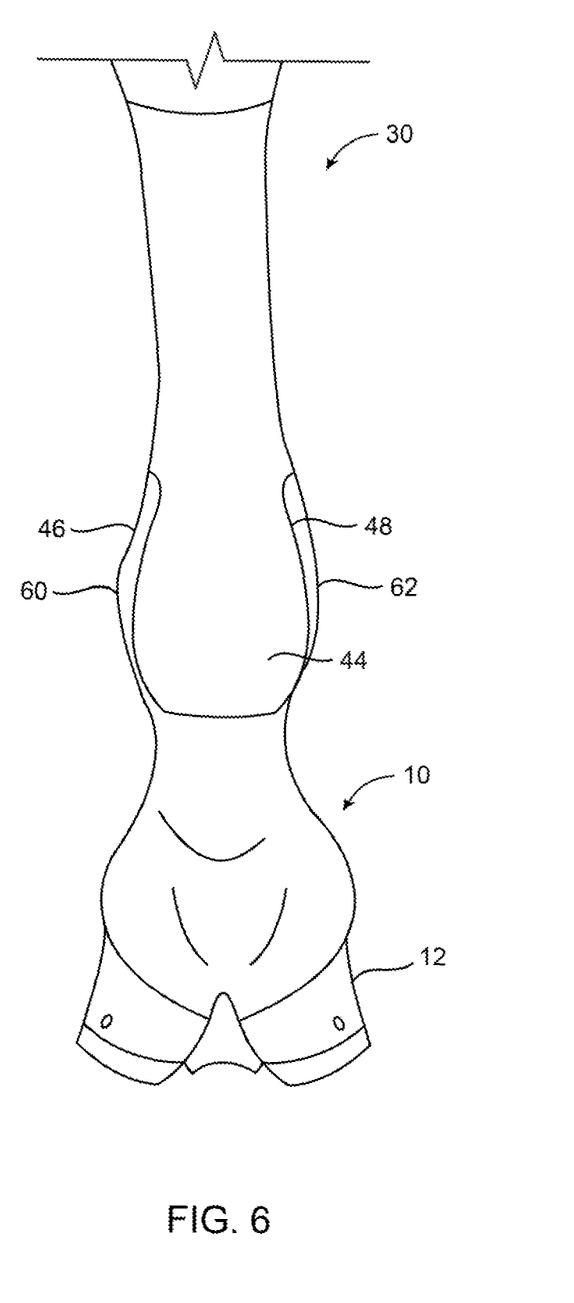
FIG. 6 is a rear view of the equine protective boot of the present invention as applied to a horse's leg.

FIG. 6 shows the back view of the equine protective boot 30 of the present invention as applied to the ankle 10 of the horse. FIG. 6 clearly shows the shape of the cup 44 which receives the proximal sesamoid bones of the horse. Further, FIG. 6 shows both lateral grooves 46 and 48 and concavo-convex formations 60 and 62.

Figure 7:
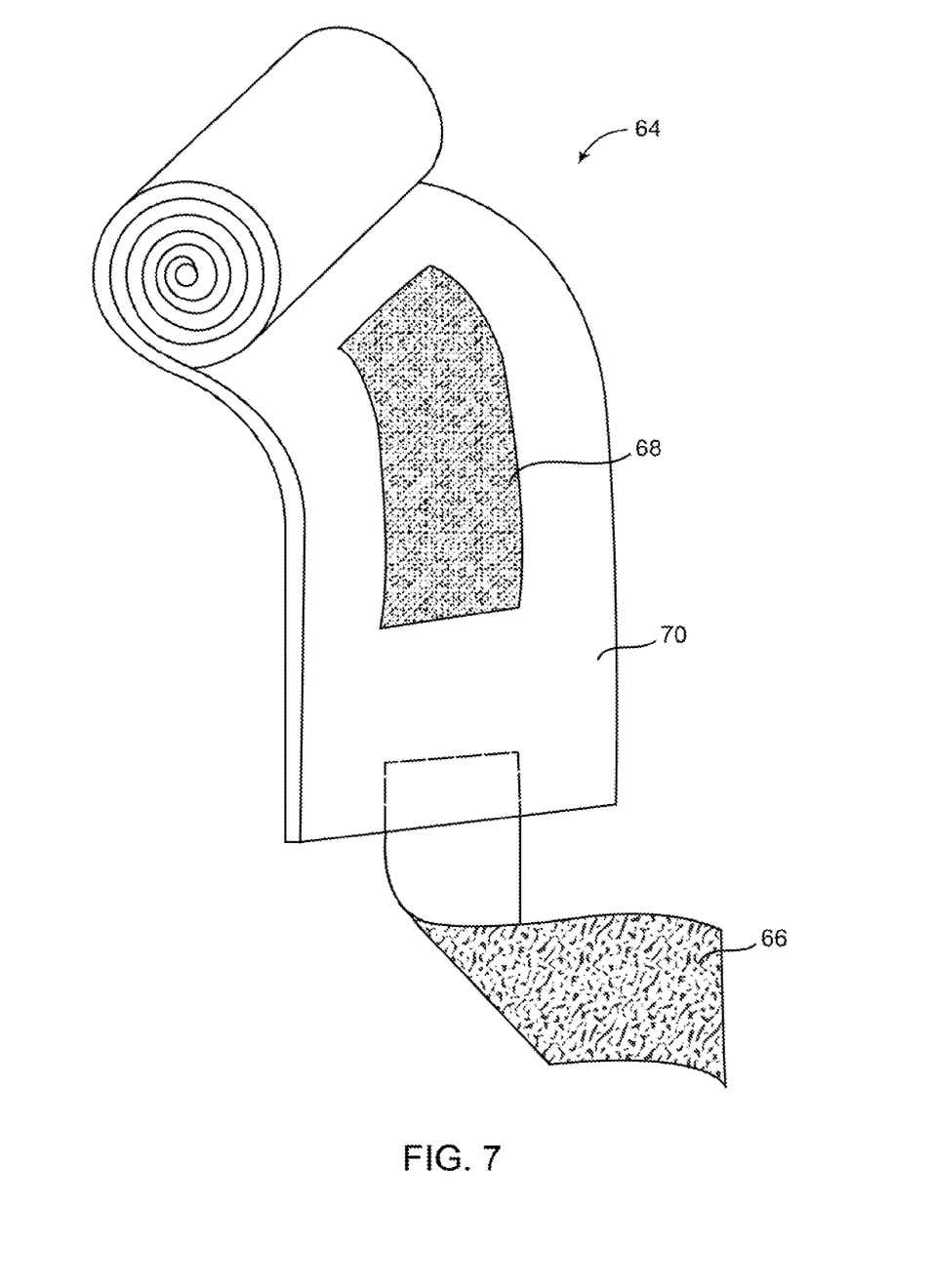
FIG. 7 is an isolated view of the elastic reinforcing wrap of the equine protective boot of the present invention.

After application of the flexible panel 32 of the equine protective boot 30, an elastic reinforcing wrap 64 is applied over the flexible panel 32. FIG. 7 shows this elastic reinforcing wrap 64. In FIG. 7, it can be seen how the elastic reinforcing wrap 64 has a hook-and-loop tab 66 and a corresponding hook-and-loop surface 68 on the surface of the reinforcing wrap 64. The laminated side 70 of the elastic reinforcing wrap 64 is shown in FIG. 7. The laminated side 70 can be laminated with a nylon fabric. This nylon fabric enables the equine protective boot 30 to repel sand, dirt, water and other debris. The elasticity of the reinforcing wrap 64 also prevents hyperextension.

Figure 8:
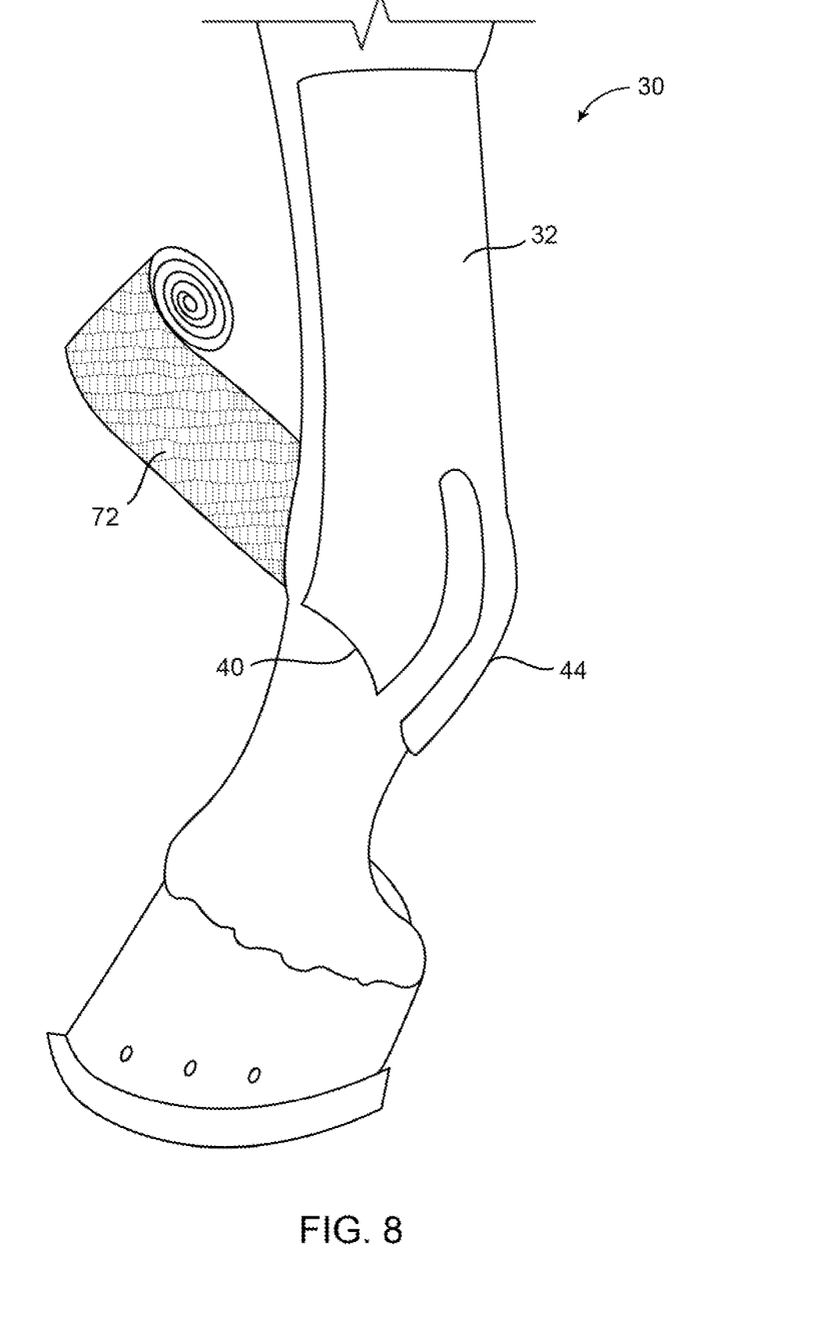
FIG. 8 is a first side view showing application of the elastic reinforcing wrap of the equine protective boot of the present invention.
Figure 9:
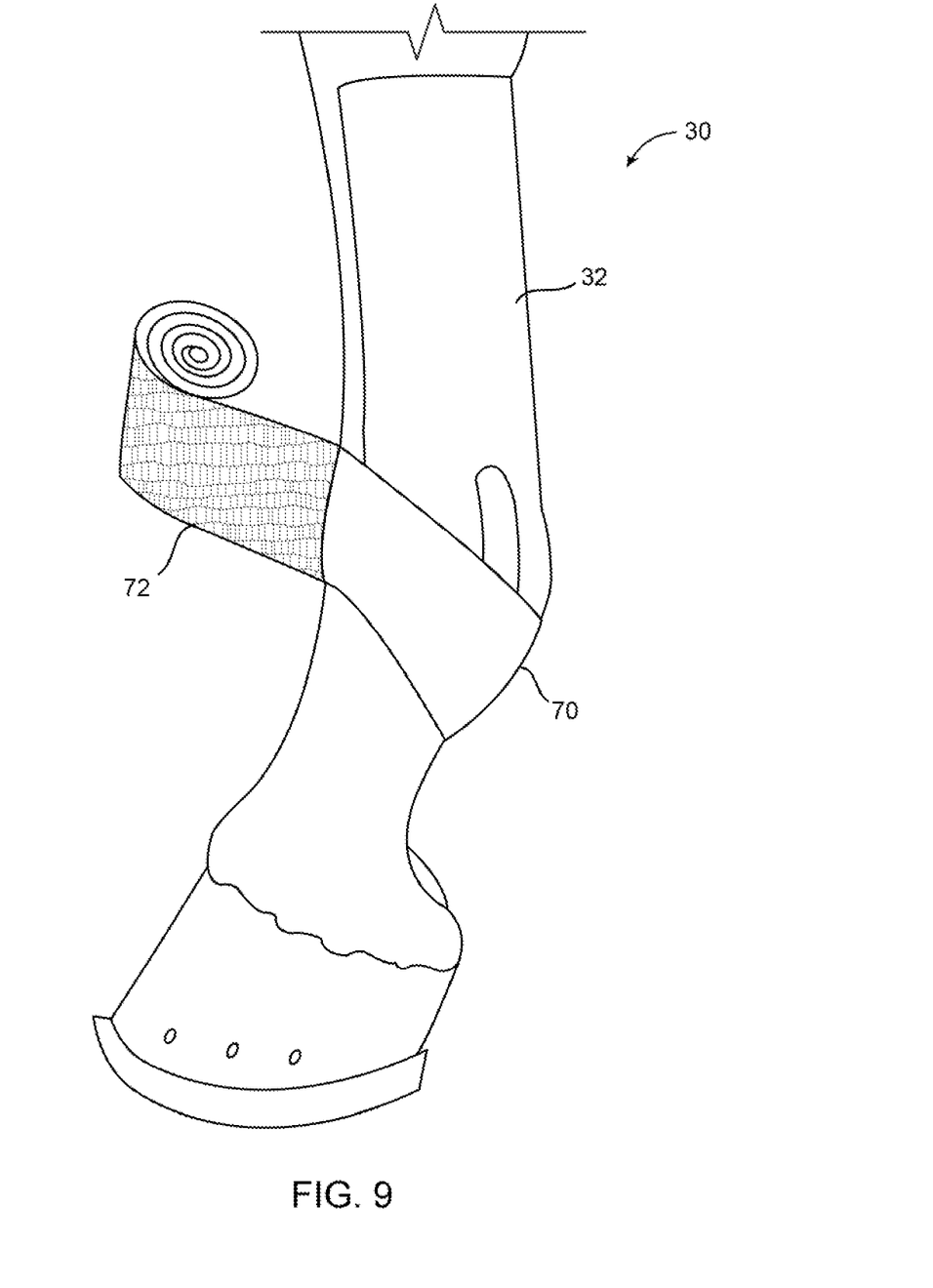
FIG. 9 is a second view showing the application of the elastic reinforcing wrap of the equine protective boot of the present invention.
Figure 10:
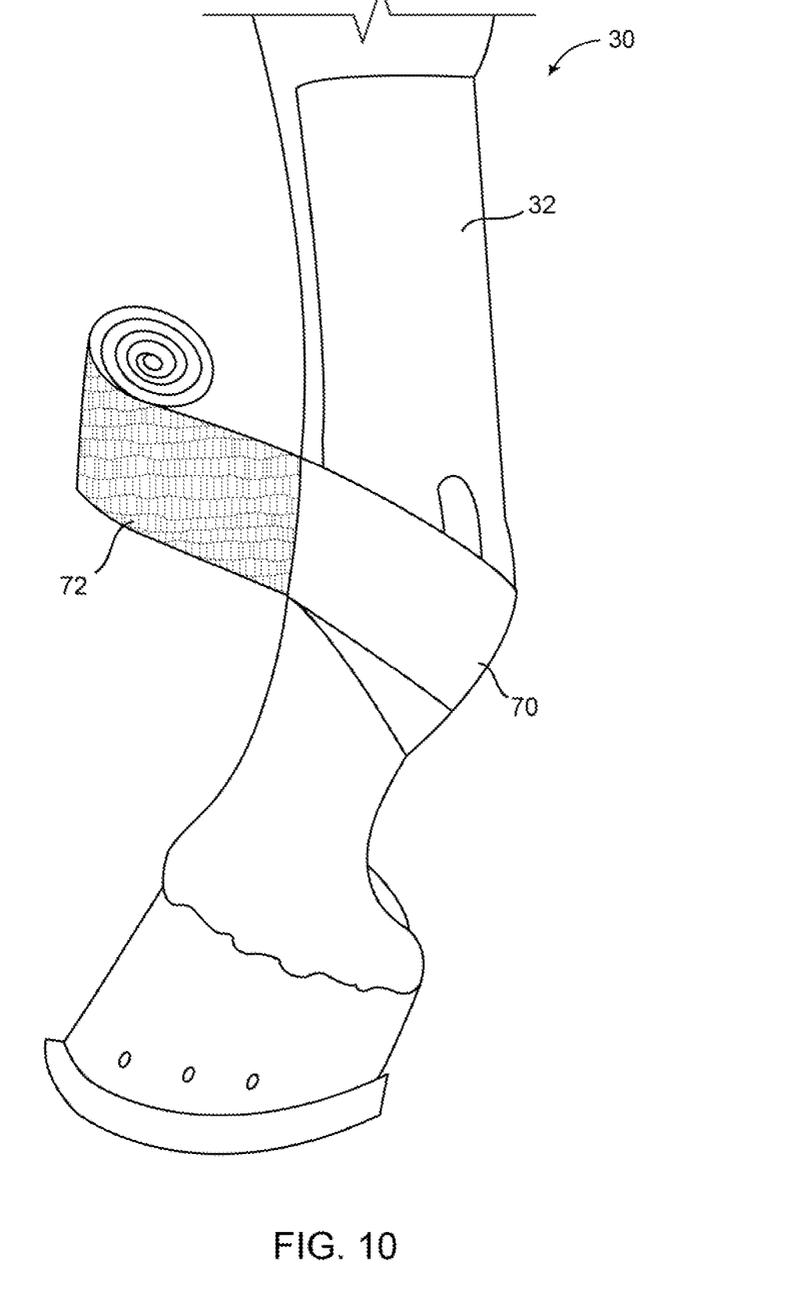
FIG. 10 is a third view showing application of the elastic reinforcing wrap of the equine protective boot of the present invention.

FIGS. 8-11 show various side views illustrating the wrapping of the elastic reinforcing wrap 64 around the flexible panel 32. In FIG. 8, it can be seen how the edge 40 of the first side portion 36 is at approximately a 45° angle relative to the ground. This angle aids in proper alignment and application of the elastic reinforcing wrap 64. In FIG. 8, it can be seen how there is a textured side 72 to the elastic reinforcing wrap 64. The textured side 72 can be a textured neoprene material which allows for grip against the outer surface of the flexible panel 32.

Figure 11:
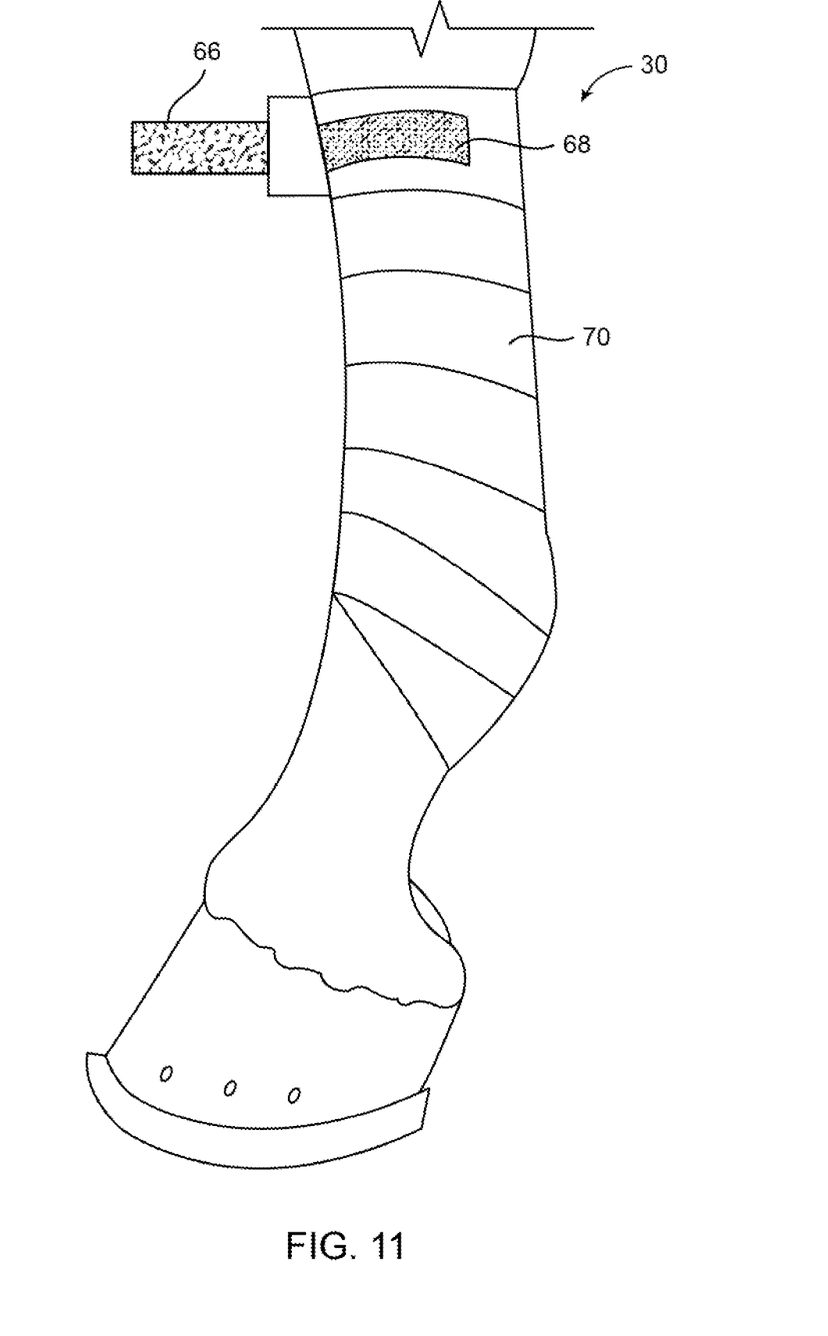
FIG. 11 is a final view showing application of the elastic reinforcing wrap of the equine protective boot of the present invention.

In FIG. 11, the application of the elastic reinforcing wrap 64 is almost complete. FIG. 11 shows how the exterior of the equine protective boot 30, at this point, is composed solely of the laminated side 70 of the elastic reinforcing wrap 64. This allows the equine protective boot 30 to repel sand, dirt, water and other debris. The final step in application of the elastic reinforcing wrap 64 includes affixing the hook-and-loop tab 66 to the corresponding hook-and-loop surface 68 on the elastic reinforcing wrap 64. Various other ways of attaching the elastic reinforcing wrap are contemplated by the inventor, however, the use of hook-and-loop material is preferred.

In addition to preventing injuries, the combination of the features of the equine protective boot of the present invention aids in the turnover of the foot and motion of the horse. This prevents stumbling and increases speed.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A protective boot assembly for the ankle of a horse, the angle of the horse having a common digital extensor tendon on a front thereof and a superficial digital flexor tendon on a back thereof and a pair of palmar digital veins on opposite sides thereof, the ankle of the horse having proximal sesamoid bones, the protective boot assembly comprising:
   a flexible panel having a middle portion and two opposing side portions extending outwardly from opposite sides of said middle portion, said flexible panel formed such that outer edges of said opposing side portions define a slot therebetween, said middle portion adapted to abut the superficial digital flexor tendon of the horse, said opposing side portions adapted to wrap around the ankle of the horse, said slot adapted to receive the common extensor tendon of the horse;
   a reinforcing wrap removably affixed around said flexible panel and extending over said slot;
   a cup formed at a bottom of said middle portion of said flexible panel, said cup adapted to receive the proximal sesamoid bones of the ankle of the horse;
   a first groove formed between said cup and one of said two opposing side portions, said first groove adapted to be positioned over the first palmar digital vein; and
   a second groove formed between said cup and another of said two opposing side portions, said second groove adapted to position over the second palmar digital vein, said reinforcing wrap extending over said first and second grooves.

2. The protective boot assembly of claim 1, said middle portion of said flexible panel having a first thickness, said two opposing side portions of said flexible panel having a second thickness, said first thickness being greater than said second thickness.

3. The protective boot assembly of claim 1, said flexible panel being of a foam material selected from the group consisting of: polyurethane, ethylene acetate copolymer, vinyl acetate copolymer, latex, polyethylene, polypropylene, silicone, cellulose acetate, neoprene, polyvinylchloride, polyester, ester and combinations thereof.

4. The protective boot assembly of claim 1, said flexible panel comprising:
   an outer foam layer; and
   an inner heat-absorbing layer lined adjacent said outer foam layer.

5. A protective boot assembly for an ankle of a horse, the ankle of the horse having a digital flexor tendon and proximal sesamoid bones on a back thereof, and a first palmar digital vein and a second palmar digital vein on opposite sides thereof, the protective boot assembly comprising:
   a flexible panel having a middle portion and two opposing side portions extending outwardly from opposite sides of said middle portion, said middle portion adapted to abut the digital flexor tendon of the horse, said two opposing side portions suitable for wrapping around the ankle of the horse;
   a cup formed at a bottom of said middle portion of said flexible panel, said cup adapted to receive the proximal sesamoid bones of the horse, said flexible panel having a first groove formed between said cup and one of said two opposing side portions, said first groove adapted to position over the first palmar digital vein, said flexible panel having a second groove formed between said cup and another of said two opposing side portions, said second groove adapted to position over the second palmar digital vein; and
   a reinforcing wrap removably affixed over said flexible panel and said cup so as to extend over said first and second grooves.

6. The protective boot assembly of claim 5, said reinforcing wrap comprising:
   an inner neoprene layer; and
   an outer laminate layer adhered against said inner neoprene layer.

7. The protective boot assembly of claim 5, the ankle of the horse having a common digital extensor tendon on a front thereof, said flexible panel having edges of said two opposing side portions that define a slot, said slot adapted to receive the common digital extensor tendon therein.

8. The protective boot assembly of claim 5, said middle portion of said flexible panel having a first thickness, said two opposing side portions of said flexible panel having a second thickness, said first thickness being greater than said second thickness.

9. The protective boot assembly of claim 5, said flexible panel comprising:
   an outer foam layer; and
   an inner heat-absorbing layer lined against said outer foam layer.

10. The protective boot assembly of claim 9, said inner heat-absorbing layer having a microencapsulated phase change material thereon or therein suitable for absorbing, storing, and releasing excess heat.

11. The protective boot assembly of claim 5, the ankle of the horse having a fetlock joint, each of said two opposing side portions having a concavo-convex formation at a lower end thereof, said concavo-convex formation adapted to receive the fetlock joint of the ankle of the horse.

12. A protective boot assembly for use on an ankle of a horse, the ankle having a common digital extensor tendon on a front thereof and a superficial digital flexor tendon on a back thereof and a pair of palmar digital veins on opposite sides thereof, the protective boot assembly comprising:
   a flexible panel having a middle portion and two opposing side portions extending outwardly from opposite sides of said middle portion, said flexible panel formed such that outer edges of said two opposite side portions define a slot therebetween, said flexible panel having a cup formed at a lower end of said middle portion, said flexible panel having a first groove formed between said cup and one of said two opposing side portions, said flexible panel having a second groove formed between said cup and another of said two opposing side portions, said middle portion having a thickness greater than a thickness of said two opposing side portions, said slot adapted to receive the common digital extensor tendon of the horse therein, said first and second grooves adapted to receive respectively the pair of palmar digital veins therein; and
   a reinforcing wrap removably affixed around said flexible panel and extending over said slot and said first and second grooves.

13. The protective boot assembly of claim 12, the ankle of the horse having a fetlock joint, each of said two opposing side portions having a concavo-convex formation at a lower end thereof, said concavo-convex formation suitable for receiving the fetlock joint of the ankle of the horse.

14. The protective boot assembly of claim 12, said flexible panel comprising:
   an outer foam layer; and
   an inner heat-absorbing layer containing microencapsulated phase change materials.

* * * * *